United States Patent Office 3,796,659
Patented Mar. 12, 1974

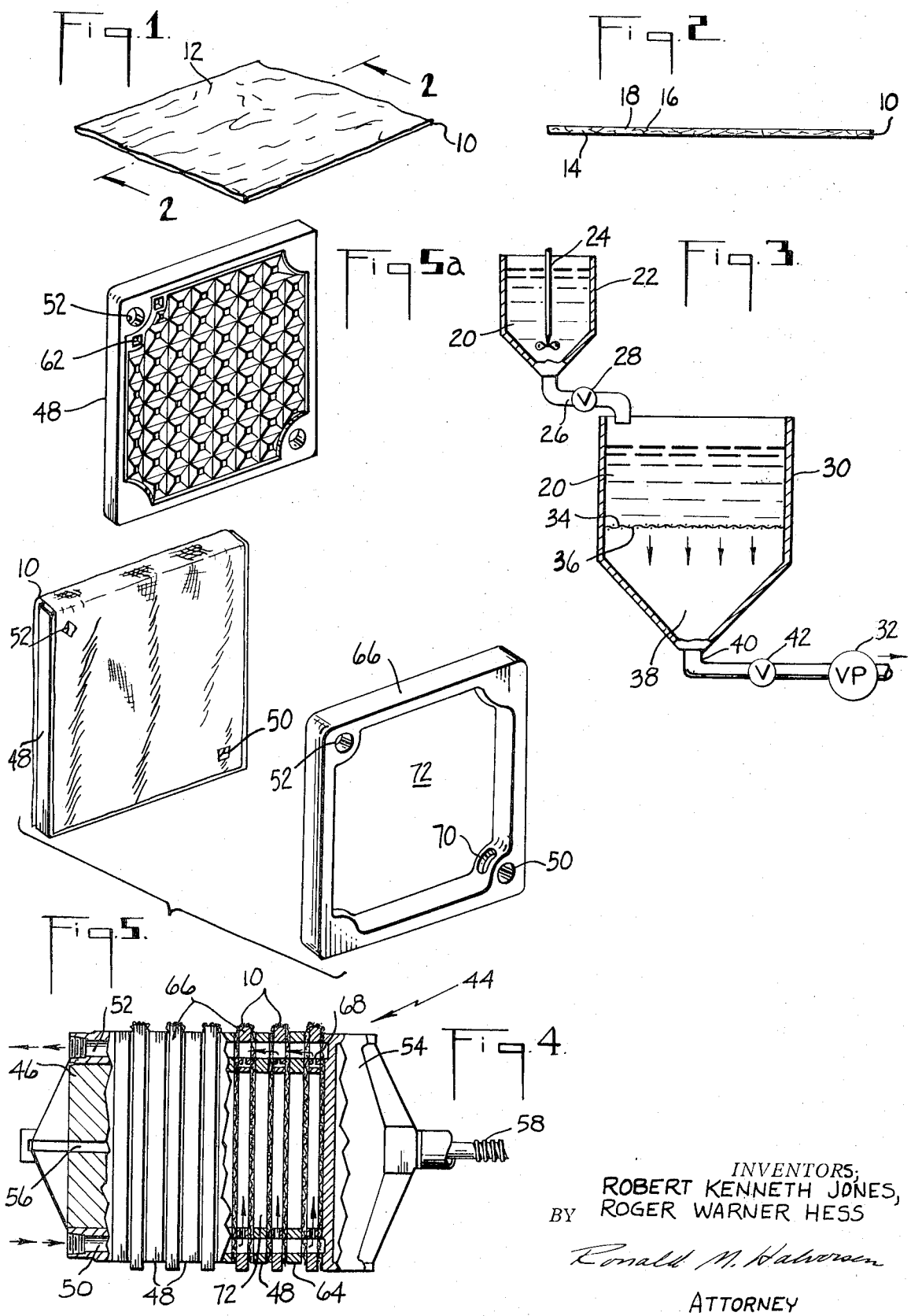

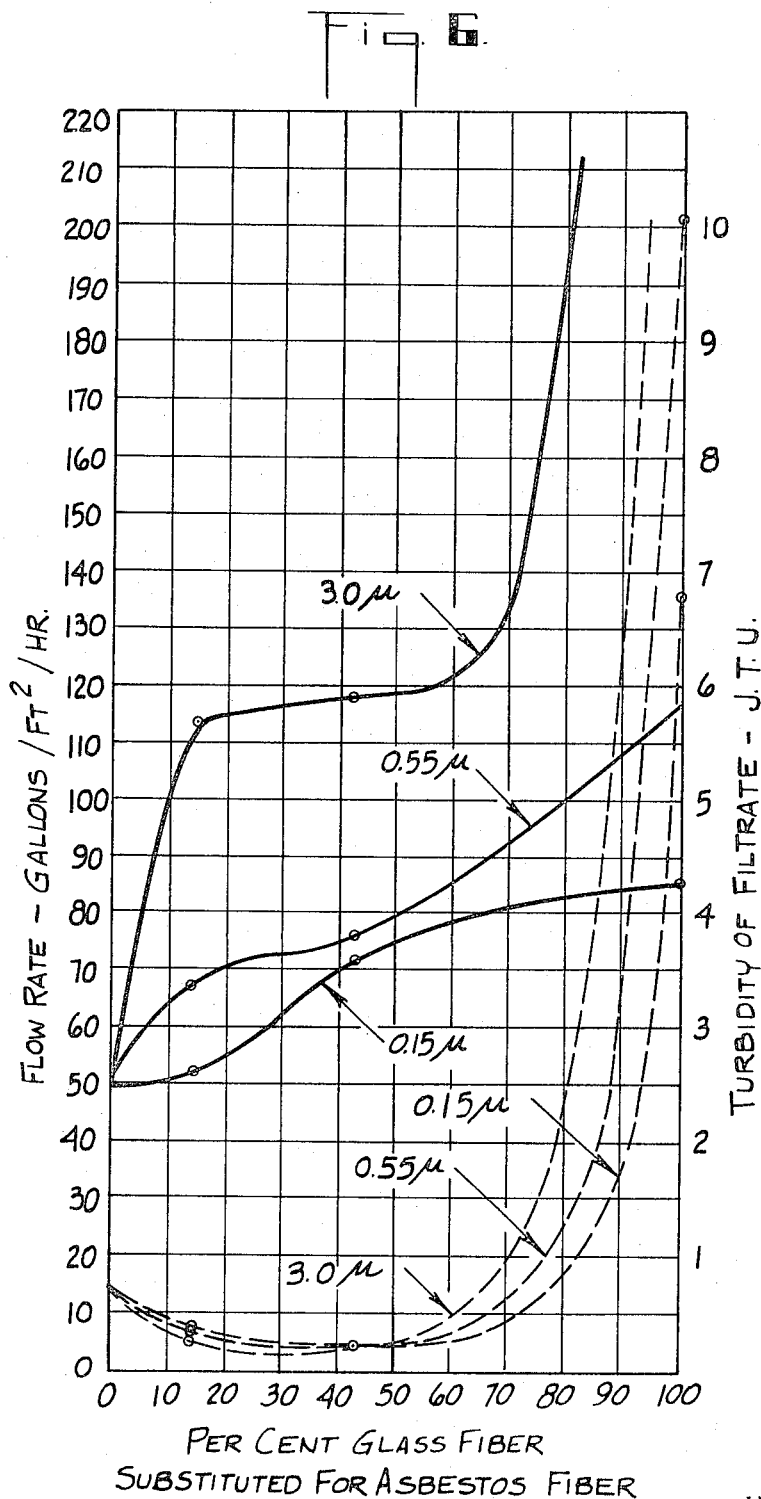

3,796,659
FILTER PAD AND FILTRATION PROCESS
Robert Kenneth Jones, New City, N.Y., and Roger Warner Hess, Kendall Park, N.J., assignors to Johns-Manville Corporation, New York, N.Y.
Filed July 29, 1971, Ser. No. 167,397
Int. Cl. B01d 27/02, 37/00
U.S. Cl. 210—65
4 Claims

ABSTRACT OF THE DISCLOSURE

Fibrous filter pads comprising cellulosic, asbestos and glass fibers. The pads are characterized by improved uniformity of permeability and are capable of filtering liquids at increased flow rates without a decrease in filtrate clarity as compared with conventional cellulosic-asbestos fiber filter pads. Cellulosic fibers comprise about 43 to about 89 percent by weight of the total fiber weight, asbestos fibers and glass fibers comprising the remainder of the fiber content of the pad with the ratio of asbestos fibers to glass fibers being in the range of about 6:1 to about 4:3. The process comprises passing a liquid to be filtered through a pad filter comprising, as the filter medium, the above referred to fibrous filter pad.

BACKGROUND OF THE INVENTION

Field of the invention

This invention relates to filter pads and methods of filtration, and more particularly relates to fibrous filter pads comprising cellulosic fibers and asbestos fibers and methods of filtering liquids utilizing such pads.

Description of the prior art

Liquids have for some time been filtered in conventional filter presses by passing the liquid through a plurality of stacked or horizontally adjacent fibrous filter pads. Such filtration techniques have been used in a variety of industries, including food processing, beer and wine production and soft drink production, among others. The fibrous filter pads conventionally used in such filtration comprise cellulosic fibers and asbestos fibers present in a wide range of weight percentages.

These conventional fibrous filter pads are customarily manufactured by forcing an aqueous slurry containing cellulosic and asbestos fibers as the solids content against a screen under a vacuum differential. In this formation process, "white water" from the slurry passes through the screen while the fibrous constituents are deposited in random orientation on the screen to form the filter pad. These pads may be of any desirable size and are used in conventional filter presses, such as a plate and frame press, to separate suspended particles from a liquid.

A major problem encountered in filtering liquids through such filter pads is their low volumetric flow rate capacities at desired filtration efficiencies (that is, clarity of the filtrate). Attempts to increase the rate that liquid flows through a filter pad within a filter press have led to filter pad constructions which employ more cellulosic fibers and less asbestos fibers per unit area of the filter pad. Such pads have a larger pore size and quite often do not filter smaller suspended particles from the liquid. An increase in the pressure drop across the filter pad can also increase the flow rate. It has been found, however, that for filter pads employing blends of asbestos fibers and cellulosic fibers the pressure drop across the pad, if too large, can reduce the size of interstices between fibers of the filter pad with the result that the permeability of the filter pad is decreased and the flow rate is reduced. Although volumetric flow rate is inversely proportional to the liquid viscosity and directly proportional to the area of the pad through which filtration occurs, these parameters, however, generally remain relatively constant for a given liquid and filtering apparatus. In addition, an inability to provide conventional asbestos-cellulosic filter pads with a relatively uniform permeability often necessitates the use of denser pad grades which contain a greater number of fibers per unit area of the pad than would be necessary if the permeability of the pad were relatively uniform. Despite the fact that employment of such pads results in reduced flow rates, the use of denser pads is frequently required to prevent suspended particles from passing through the more porous portions of a non-uniformly permeable pad. Such filtering considerations have at times resulted in lower flow rates than was considered desirable to attain for commercial operations.

It can be seen that heretofore it was not commercially feasible to increase the volumetric flow rate through such pads because the filtrate clarity decreased due to the inability of the pads to remove suspended particles in the liquid or because the pads were compressed to such an extent that permeability decreased.

OBJECTS OF THE INVENTION

It is an object of the invention to provide an improved fibrous filter pad.

It is a further object of the invention to provide an improved fibrous filter pad comprising cellulosic fibers and asbestos fibers which can be used to filter liquids at increased volumetric flow rates and acceptable levels of filtrate clarity.

It is an additional object of the invention to provide a method of filtering liquids through fibrous filter pads at increased volumetric flow rates and acceptable levels of filtrate clarity.

It is another object of the invention to provide a method of filtering liquids through a filter press at increased volumetric flow rates and acceptable levels of filtrate clarity.

These and other objects of the invention may be apparent to those skilled in the art from the description which follows and from the drawings.

All parts and percentages in the specification and claims are by weight unless otherwise indicated.

SUMMARY OF THE INVENTION

It has been found that liquids containing suspended particles can be filtered through fibrous filter pads comprising cellulosic fibers and asbestos fibers at increased flow rates and at acceptable levels of filtrate clarity by including glass fibers in filter pad composition. Glass fibers, when substituted for a portion of the asbestos fibers present in conventional filter pads, in an amount of about 5 to about 80 percent of the asbestos fibers originally present, result in a marked increase in liquid flow rates through a filter press with filtrate clarities at least as good as those obtained with similar fibrous filter pads not incorporating the glass fibers. Surprisingly, increases in flow rates of over 100 percent as compared to conventional filter pads have been attained by incorporating glass fibers in the pad, with clarity levels better than those of the conventional pads. It is believed that this increase in flow rate without a deleterious effect on filtrate clarity results from the tendency of the glass fibers distributed throughout the pad to increase the pad's ability to resist compression.

In addition, it has surprisingly been found that by incorporating glass fibers into filter pads in the amounts stated above, such pads possess a more uniform permeability than that possessed by prior pads formed of cellulosic fiber and asbestos fiber alone. It is believed that the glass fiber aids in uniformly forming the pad from the precursor slurry and thus results in a filter pad which is more uniformly permeable.

The filter pad of this invention may be used to separate solids from carrier liquids which liquids do not detrimentally attack the fibers of the filter pad. Several pads of this invention may be stacked and utilized in a filter press, such as a plate and frame filter press. For given liquid viscosities and operating pressures, the pad can be employed to more than double the flow rate capacity of filtering apparatus employing conventional cellulose-asbestos pads without reducing the clarity of the filtrate.

BRIEF DESCRIPTION OF THE DRAWINGS

FIG. 1 is an isometric view of one form of a filter pad of this invention.

FIG. 2 is a sectional view taken on line 2—2 of FIG. 1.

FIG. 3 is a schematic illustration of a process and apparatus for forming a filter pad of this invention.

FIG. 4 is an isometric view of a filter press incorporating an embodiment of this invention.

FIG. 5 is an exploded front elevation view of a portion of the apparatus of FIG. 4.

FIG. 5a is a perspective view of a filter plate shown in FIGS. 4 and 5.

FIG. 6 is a graphical representation of the filtration characteristics of the filter pads of this invention compared to other filter pads, wherein flow rate and turbidity are plotted against percent glass fiber substituted for asbestos fiber.

DESCRIPTION OF THE PREFERRED EMBODIMENT

The filter pads of this invention comprise cellulosic fibers, asbestos fibers and glass fibers in certain ranges. Glass fiber is present in an amount of about 5 to about 80 percent of the asbestos fibers present in a correspondingly conventional cellulosic-asbestos filter pad. In such conventional pads, asbestos fiber may be present in the range of about 3 to about 70 percent by weight and cellulosic fiber is present in an amount ranging from about 97 to about 30 percent. The ratio of cellulosic fiber to asbestos fiber may vary within the above ranges for conventional filter pads depending principally upon the desired porosity of the pad. In general, the presence of a larger amount of asbestos fiber results in a smaller pore opening in the filter pad.

The filter pads of the present invention comprise cellulosic fiber present in an amount ranging from about 30 to about 97 percent by weight. The reamining fiber content, about 3 to about 70 percent by weight, comprises asbestos fibers and glass fibers in a particular amount. Glass fiber is present in an amount in the range of about 5 to about 80 percent by weight of the combined weight of asbestos and glass fiber, with the asbestos fiber being present in an amount of from about 20 to about 95 percent by weight of the combined weight.

The filter pads of this invention may be produced by conventional fibrous filter pad forming processes modified so as to include glass fiber in the pad. For example, a slurry containing a mixture of fibers as the solids content and water may be drawn under a vacuum differential against a filter pad forming screen having a mesh size, for example, ranging from about 14 to about 20 U.S. Standard Sieve Screen size. The solids content of the aqueous slurry may typically range from about 0.5 to about 8 percent by weight and comprise a mixture of cellulosic, asbestos and glass fibers in the approximate amounts desired in the filter pad. White water from the slurry passes through the screen while the cellulosic, asbestos and glass fibers are deposited in random orientation on the screen. The deposited layer is thereafter removed from the screen and dried in a conventional manner.

Referring to the drawing, there is illustrated in FIG. 1 a filter pad 10 comprising discontinuous individual fibers 12. These fibers comprise glass fiber as well as asbestos fiber and cellulosic fiber of the type conventionally used in filter pads. The glass fiber preferred is a small diameter fiber of a diameter in the range of about 0.15 to about 14 microns. The asbestos fiber suitable for use in filter pad 10 may include any crystalline hydrous magnesium silicate fiber which ranges from group 1 to group 9 Quebec Asbestos Mining Association grade. Chrysotile asbestos fibers are generally preferred. A cellulosic fiber generally of the type derived from wood which is either bleached or unbleached may be employed, although bleached cellulosic fiber is usually preferred. As illustrated in FIG. 1, the individual fibers of glass, asbestos, and cellulose are randomly oriented and relatively homogeneously mixed throughout a substantial portion of the pad 10.

In FIG. 2 there is illustrated a section of pad 10. The asbestos fiber 14 and cellulosic fiber 16 are of the same general character as is generally used in commercial filter pads. Obviously, however, the process of forming pad 10 differs from the process of forming pads from blends of asbestos and cellulosic fibers alone, in that glass fiber 18 is homogeneously mixed along with the cellulosic and asbestos fibers throughout the pad. The combined pad 10 is substantially no thicker than a corresponding pad which employs a blend of asbestos and cellulosic fibers alone. It should be noted that the showing of glass fiber, asbestos fiber, and cellulosic fiber in the drawings is for the purpose of indicating a more or less random and homogeneous mixture of a significant portion of the glass, asbestos, and cellulosic fiber, and should not be considered as an accurate illustration of the fibers themselves.

In FIG. 3 there is shown, schematically, a portion of an apparatus by which the product of FIG. 1 may be produced. The fiber ingredients which form the solids content of an aqueous slurry 20 are combined in a tank 22 in a desired mixture and agitated by propeller or other type mixer 24. In further describing the invention reference will be made to the use of glass fiber in conjunction with asbestos and cellulosic fiber of the type conventionally used to make filter pads. It should be understood that the glass fiber employed is but one example of various monofilament fibers exemplifying similar properties which could be employed to practice the invention.

A predetermined quantity of the mixed slurry 20 is fed from tank 22 through conduit 26 and valve 28 into vacuum box 30. The quantity of slurry 20 transferred to vacuum box 30 generally depends on the size and thickness of the filter pad desired and upon the solids content of the slurry. In general, the solids content of the slurry will range from about 0.5 percent to about 8 percent. The selection of a particular solids content and quantity of slurry will, of course, depend upon the uses to which the product is to be adapted and the desired properties of the pad, and such considerations will be well understood by those skilled in the art.

A vacuum of about 1 inch or more of mercury, is then exerted for at least 2 seconds on the slurry 20 within vacuum box 30 by vacuum pump 32. The slurry 20 is thereby drawn against screen 34 which has a wire mesh ranging from about 14 to about 20 United States Standard mesh size and which is supported within vacuum box 30 by drainage member support 36. The mesh size of the screen 34 will of course depend on the type of fiber used to form the pad 10 and can extend beyond a range from about 10 to about 40 United States Standard mesh size depending on the diameter and length of the fiber employed. White water 38 from the slurry passes through the screen 34 and is discharged through conduit 40, valve 42, and vacuum pump 32 to waste. The asbestos, cellulosic and glass fibers deposited on the screen 34 form the filter pad 10 having fibers 14, 16, and 18 randomly oriented and homgeneously mixed throughout.

While the apparatus as broadly described above is entirely conventional and is operated in a conventional manner, the blended asbestos, cellulosic, and glass fiber filter pad 10 produced thereon exhibits a number of advantages over conventionally produced filter pads comprising asbestos and cellulosic fiber alone. For example, as previously mentioned, the clarity of the filtrate can be adversely affected if a pad is not uniformly permeable. Liquid forced against the surface of a filter pad tends to pass through the most permeable portion of the pad. If a portion of of a filter pad is considerably more permeable than other portions of the pad, the unfiltered liquid rushes through the more permeable portion and thus the clarity of the filtrate is reduced. Surprisingly, it has been found that when glass fiber of the type described above is combined with the asbestos and cellulosic fiber conventionally used in the construction of filter pads in the amount described above, the pad is provided with a more uniform permeability. In addition, the filter pad of the percent invention tends to exhibit greater resistance to compression during pressure filtration than conventional asbestos-cellulosic pads. As a result the filter pad of this invention is capable of high filtration rates without decreased clarity of the filtrate. The pad can be used to separate suspended particles from any liquid which does not deleteriously affect the fibers. Such liquids may include substantially all water solutions, aromatic and aliphatic liquids, and emulsions of all types. As an example of the properties of the filter pad of this invention, for the liquid viscosity and operating pressure indicated in Table II below, the pad increased the rate of filtration obtainable with filter pads employing a blend of asbestos and cellulosic fibers by about 135 percent without reducing the clarity of the filtrate.

In FIG. 4 there is illustrated a portion of a plate and frame filter press in which the filter pad 10 of the present invention can be used. The apparatus shown in FIG. 4 is entirely conventional and is operated in a conventional manner. FIG. 4 is intended to illustrate but one of the many uses to which pad 10 may be put. It should be apparent, for example, that pad 10 could be employed in a chamber filter press or in a variety of pressure filtering apparatus. The pad need not have a rectangular shape but may be cut into discs or other suitable configurations shaped to coact with the apparatus with which the filter pad is employed. As illustrated by FIG. 4, the filter press, shown generally at 44, is provided with a fixed filtering head 46, a plurality of filter plates 48 and frames 66 each provided with an inlet port 50 and a discharge port 52, a loose filter head 54 side support members 56, and closing and tightening screw 58. As noted above, the construction and operation of the parts of filter press 44 should be well understood by those skilled in the art.

In FIG. 5 there is illustrated an exploded portion of the apparatus of FIG. 4. Filter press 44 comprises a plurality of plates 48 and frames 66. The filter pad 10 can be positioned as illustrated over plate 48. Loose filter head 54 is then moved toward fixed filter head 46 by the action of screw 58 until each plate 48 and frame 66 is tightly secured in abutting relationship adjacent side members 56 and between filter heads 46 and 54. Inlet ports 50 and discharge ports 52 form continuous closed pipes for inlet of the turbid liquid and discharge of the filtrate. Unfiltered liquid passing through port 50 and orifice 70 in frame 66 fills the cavity 72 between plate 48 and palte 64. The unfiltered liquid then passes through filter pad 10, which separates suspended particles from the liquid. As illustrated in FIG. 5a, the filtrate is channeled along plate 48 into drainage orifice 62 and through conduit 68 to discharge port 52.

The following example is presented to provide a more complete understanding of the invention. The specific techniques, conditions, materials, proportions and reported data set forth to illustrate the further principles and practice of the invention are exemplary and should not be construed as limiting the scope of the invention.

EXAMPLE

The filtration flow rate, permeability and particle size retention was determined for conventional filter pads consisting of asbestos and cellulosic fibers blended in various amounts. A sample in strip form was cut from each pad so as to extend in a direction generally radially outward from the center of the pad. The sample was cut into pieces, placed into a prefired and weighed crucible and dried overnight at 105° C. The dried weight of the sample was measured. The sample was burned-off" over a Bunsen burner to carbonize cellulosic material present in the sample, and fired in an electric muffle at 1800° F. for one hour. The resultant asbestos residue was weighed. This weight was increased by 13% to correct for the water of crystallization removed. The corrected weight was used to calculate the percent of asbestos used in the composition of the pad.

Four discs were cut from the pad, one from the outer corner, one from exact center, and the remaining discs from each side of the center. Each disc was tightly sealed within a cylinder so that the surface of the disc extended across the cylinder's inside diameter and transversely of the longtudinal axes of the cylinder. To determine the permeability of the disc, deionized water was filtered through a filter pad having a controlled pore size of 0.22 micron. The time was measured for the passage of 300 ml. of the deionized and filtered water through each disc under a vacuum of 400 mm. of mercury at 25° C. The measured flow times for the four discs of each pad sample were averaged and the flow time range (the difference between the highest and the lowest flow times) was determined. Percent range deviation was calculated by dividing the flow time range by the average flow time and multiplying by 100.

A standard test liquid was made up containing the following particles of artificial turbidity to determine filtration flow rate and clarity:

| Particles: | Mean particle size, microns |
|---|---|
| 25% | 2.0 |
| 25% | 4.8 |
| 25% | 7.0 |
| 25% | 11.0 |

Each fraction of mean particle size solids weighed 1.3 grams. The combined fractions, weighing 5.2 grams in total, were treated with 25 mg. of sodium tripolyphosphate in 20 ml. of water to maintain the original size of the particles in a dispersed state. The slurry was homogenized to insure dispersion of the particles and diluted with water to 2600 ml. The dilute slurry was used as the "master batch" of turbidity, and measured 58 Jackson Turbidity Units (J.T.U.) when tested on a Hach Model 2100 turbidimeter.

For each filtration, the slurry was vigorously shaken and a representative sample of 200 ml. was made up to 4 liters with a resultant concentration equivalent to 100 mg. per liter. The 4 liter sample of 100 parts per million turbidity was used to conduct a constant pressure filtration in a stainless steel bomb filter. The four most permeable samples were filtered at a pressure differential of 5 p.s.i. and the remaining samples at 40 p.s.i. Filtrate collected during the first 3 minutes was reserved for turbidity determination by means of the Hach turbidimeter. Turbidity readings indicate the relative clarity of the filtrate, the clarity being inversely proportional to the measured turbidity. Each 4 liter sample was allowed to flow through each pad for a period of 21 minutes. The accumulative flow was plotted on log-log paper against time in minutes. The plotted points resulted in a straight line with a definite slope, which was extrapolated to give the total liquid flow at the end of one hour's elapsed time. The total flow was then expressed in terms of gallons per square foot per hour through each pad. The flow rate measured at 5 p.s.i. was converted to a 40 p.s.i. basis for comparison, using the following formula:

Flow rate @ 40 p.s.i.=flow rate @ 5 p.s.i.$\times \sqrt{40/5}$

The results for this series of tests of conventional cellulosic-asbestos fiber pads are shown in Table I.

TABLE I

| Sample | Percent asbestos | Permeability ||| Flow rate |||  Filtrate turbidity (JTU) |
|---|---|---|---|---|---|---|---|---|
| | | Averaged flow time (sec.) | Flow time range (sec.) | Percent range deviation | Operating pressure (p.s.) | Operating flow rate gal./ft.²/hr.) | Flow rate at 40 p.s.i. (gal/ft.²/hr.) | |
| 1 | 3.1 | 6.5 | 5 | 77 | 5 | 242 | 682 | 24 |
| 2 | 4.7 | 12.5 | 4 | 32 | 5 | 123.6 | 348 | 17 |
| 3 | 11.0 | 28.4 | 19 | 67 | 5 | 49.7 | 140 | 2.1 |
| 4 | 15.4 | 80 | 47 | 58 | 5 | 35 | 99 | 0.8 |
| 5 | 20.6 | 250 | 140 | 56 | 40 | 71 | 71 | 0.12 |
| 6 | 24.2 | 945 | 400 | 42 | 40 | 53 | 53 | 0.12 |
| 7 | 29.0 | 280 | 125 | 45 | 40 | 55 | 55 | 0.65 |
| 8 | 41.3 | 540 | 145 | 27 | 40 | 57 | 57 | 0.13 |
| 9 | 40.5 | 1,365 | 270 | 20 | 40 | 47 | 47 | 0.18 |
| 10 | 47.2 | 1,570 | 400 | 25 | 40 | 42 | 42 | 0.25 |
| 11 | 57.2 | 1,885 | 500 | 27 | 40 | 44 | 44 | 0.28 |

Another series of tests were run to establish the performance of the cellulosic-asbestos glass fiber filter pads of this invention. Individual filter pads of 500 grams each were formed on a vacuum box from an aqueous slurry containing the fibrous solids. Control samples, containing 65 percent cellulosic fiber and 35 percent asbestos fibers were made as the first and last samples. Glass fiber of an approximate length of 1/16 inch and in the amounts of 5 percent, and 15 percent of the total solids content was mixed with 65 percent cellulosic pulp, with the remainder of the solids content comprising asbestos fiber. Pads comprising 65 percent cellulosic and 35 percent glass fibers were also formed. Pads with the above weight percentages were formed from three types of glass fiber: Micro-Fiber 102 (average diameter 0.15 micron), Micro-Fiber 106 (average diameter 0.55 micron) and Micro-Fiber 112 (average diameter 3.0 microns), all of which are available from Johns-Manville. The cellulosic pulp fiber and asbestos fiber were each of the type conventionally employed to form filter pads. The pads were tested for permeability, filtration flow rate and turbidity using the same procedures referred to above with respect to the conventional cellulosic-asbestos fiber filter pads. The results are shown in Table II.

stituting 14.25% of the asbestos fibers with glass fibers having an average diameter of 3.0 microns (sample 18). Significant flow rate increases were also measured for each of the glass fiber diameters tested at substitution levels of 43% of the asbestos fiber, again without adversely affecting filtrate clarity and again with an increase in clarity over the test samples. When all the asbestos fiber in the filter pads was eliminated and substituted by glass fiber (samples 19–21) very large increases in filtration flow rate were measured, but the clarity of the filtrate decreased beyond normally acceptable levels. From the curve of turbidity vs. glass fiber content of FIG. 6, it can be ascertained that by substituting up to about 80 percent of the originally present asbestos fibers with glass fibers, substantial increases in filtrate flow rates are obtainable without an adverse effect on filtrate clarity. The glass fiber should be present in an amount between about 5 to about 80 percent based on the weight of asbestos fiber originally present. Glass fiber content can alternately be described as in the range of about 5 to about 80 percent by weight of the combined weight of asbestos and glass fiber.

The results of Table II also indicate a surprising increase in uniformity of pad permeability resulting from the presence of glass fiber. The column "Percent Range Deviation," abbreviated "Percent Range Dev.," indicates

TABLE II

| Sample | Composition (percent)[1] ||| Glass, percent of asbestos | Average diameter fiber glass (microns) | Permeability ||| Flow rate ||| Filtrate turbidity (JTU) |
|---|---|---|---|---|---|---|---|---|---|---|---|---|
| | C | A | G | | | Avg. flow time (sec.) | Flow time range (sec.) | Percent range deviation | Operating pressure (p.s.i.) | Operating flow rate[2] | Flow rate at 40 p.s.i.[2] | |
| 12 | 65 | 35 | 0 | 0 | --- | 719 | 219 | 34.6 | 40 | 44.1 | 44.1 | 0.36 |
| 13 | 65 | 30 | 5 | 14.25 | 0.15 | 726 | 14 | 1.9 | 40 | 50.6 | 50.6 | 0.31 |
| 14 | 65 | 30 | 5 | 14.25 | 0.55 | 288 | 56 | 19.4 | 40 | 66.6 | 66.6 | 0.22 |
| 15 | 65 | 30 | 5 | 14.25 | 3.0 | 183 | 43 | 23.5 | 40 | 113.9 | 113.9 | 0.24 |
| 16 | 65 | 20 | 15 | 43 | 0.15 | 288 | 44 | 15.3 | 40 | 70.3 | 70.3 | 0.22 |
| 17 | 65 | 20 | 15 | 43 | 0.55 | 216 | 57 | 26.4 | 40 | 75.2 | 75.2 | 0.22 |
| 18 | 65 | 20 | 15 | 43 | 3.0 | 95 | 57 | 60.0 | 5 | 41.9 | 118.1 | 0.21 |
| 19 | 65 | 0 | 35 | 100 | 0.15 | 76 | 11 | 14.5 | 5 | 30.1 | 84.9 | 6.7 |
| 20 | 65 | 0 | 35 | 100 | 0.55 | 31 | 6 | 19.3 | 5 | 41.2 | 116.2 | 10.0 |
| 21 | 65 | 0 | 35 | 100 | 3.0 | 2.6 | 0.6 | 21.5 | 5 | 142 | 400 | 35.5 |
| 22 | 65 | 35 | 0 | 0 | --- | 442 | 58 | 13.1 | 40 | 52.6 | 52.6 | 1.0 |

[1] C=Cellulosic; A=Asbestos; G=Glass.
[2] Gal./ft.²/hr.

The column "Glass percent of asbestos" represents the percent of asbestos fiber originally present in Example 12 which are replaced by glass fiber. The results tabulated in Table II are shown graphically in FIG. 6, wherein flow rate and turbidity of filtrate are plotted against the glass fiber content of the filter pad, expressed as the percent of asbestos fiber replaced by glass fiber. Flow rate and turbidity readings for the control samples (samples 12 and 22) were averaged in preparing FIG. 6.

Table II and FIG. 6 show the improved properties possessed by the filter pads of this invention. It is apparent that for each of the glass fiber diameters tested, by substituting a small amount (e.g. 14.25%) of the asbestos fibers with such glass fibers, the filtration flow rate markedly increases without adversely affecting the clarity of the filtrate. Surprisingly, the filtrate clarity actually increases with the increased flow rates. Filtration flow rates of more than twice that obtainable with cellulosic-asbestos filter pad control samples were obtained by subthe extent of non-uniformity in flow time through four samples of each pad and hence is an indication of the extent of non-uniformity in permeability of the pad. The percent range deviations listed in Table II shows in general a good uniformity of formation of the pad, with uniformity being controlled best by the smallest diameter glass fiber tested, 0.15 micron. When compared to the conventional cellulosic-asbestos fiber filter pads of Table I, the glass-cellulosic-asbestos fiber pads of this invention show in general a subtsantial increase in uniformity of permeability.

It is preferred to use glass fiber of a diameter in the approximate range of 0.05 to 14 microns, with a more preferred range being from about 0.05 to about 7 microns. Although glass fiber is the most preferred fiber to be used in conjunction with cellulosic and asbestos fibers in forming fibrous filter pads, other monofilament fibers having similar surface characteristics and properties could be employed in such pads as a substitute for all or part of the glass fiber. For example, monofilament fibers of polyolefins, nylon, polyester, acrylic and other synthetic monofilament fibers could be used.

Although it is preferred to form the fibrous filter pad from fibrous material only, other materials may be present in the pad. For example, a binder material may be incorporated in the pad to bind the fibers to one another.

The fibrous filter media of this invention find particular utility in filtering liquids through pad filters, particularly pad filters which comprise a plurality of filter pads arranged in a horizontal or vertical direction. For example, the filter pads can be incorporated into a plate and frame filter press, or similar equipment, to filter turbid fluids.

It is to be understood that variations and modifications of the present invention may be made without departing from the spirit of the invention. It is also to be understood that the scope of the invention is not to be interpreted as limited to the specific embodiment disclosed herein, but only in accordance with the appended claims when read in light of the foregoing disclosure.

We claim:

1. A fibrous filter pad comprising, cellulosic fibers, present in an amount in the range of about 43 to about 89 by weight of the total weight of the fibers present in the pad, asbestos fibers and glass fibers comprising the remainder of the fiber content of the pad with the weight ratio of asbestos fibers to glass fibers being in the range of about 6:1 to about 4:3, said glass fibers having a diameter of about 0.15 microns to about 3.0 microns, wherein said filter pad is capable of filtering liquids at increased flow rates without a decrease in filtrate clarity as compared to fibrous filter pads consisting essentially of cellulosic fibers and asbestos fibers.

2. A fibrous filter pad as claimed in claim 1 wherein the asbestos fibers are of the chrysotile variety and the cellulosic fibers are derived from wood.

3. A process for filtering a liquid comprising passing said liquid through a pad filter, said pad filter comprising at least one filter pad comprising cellulosic fibers, present in an amount in the range of about 43 to about 89 percent by weight of the total weight of the fibers present in the pad, asbestos fibers and glass fibers comprising the remainder of the fiber content of the pad with the weight ratio of asbestos fibers to glass fibers being in the range of about 6:1 to about 4:3, said glass fibers having a diameter of about 0.15 micron to about 3.0 microns, whereby said liquid can be filtered at increased flow rates without a decrease in filtrate clarity as compared to filtering said liquid through a fibrous filter pad consisting essentially of cellulosic and asbetsos fibers.

4. A process as claimed in claim 3 wherein said pad filter comprises a plurality of filter pads and wherein said liquid is passed through said filter pads.

References Cited

UNITED STATES PATENTS

| | | | |
|---|---|---|---|
| 3,256,997 | 6/1966 | Poll et al. | 210—Dig. 5 |
| 3,142,612 | 7/1964 | Reiman | 210—Dig. 5 |
| 550,955 | 12/1895 | Enzinger | 210—226 |
| 2,746,607 | 5/1956 | Hess | 210—Dig. 5 |
| 3,209,916 | 10/1965 | May et al. | 210—Dig. 5 |
| 3,210,229 | 10/1965 | Leine | 210—Dig 5 |
| 3,061,107 | 10/1962 | Taylor | 210—Dig. 5 |

SAMIH N. ZAHARNA, Primary Examiner

T. A. GRANGER, Assistant Examiner

U.S. Cl. X.R.

210—Dig. 5, 505

PO-1050
(5/69)

UNITED STATES PATENT OFFICE
CERTIFICATE OF CORRECTION

Patent No. 3,796,659    Dated March 12, 1974

Inventor(s) Robert K. Jones and Roger W. Hess

It is certified that error appears in the above-identified patent and that said Letters Patent are hereby corrected as shown below:

Column 3, line 47, "reamining" should read --remaining--.
Column 5, line 6, "of of" should read --of--.
Column 5, line 60, "palte" should read --plate--.
Column 6, line 7, "burned off"" should read --"burned off"--.
Column 6, line 20, "longtudinal" should read --longitudinal--.
Table I, line 5, "ps" should read --psi--.
Column 7, line 61, "are" should read --was--.
Column 8, line 62, "shows" should read --show--.
Column 9, line 25 (Claim 1), insert --percent-- after "89".

Signed and sealed this 9th day of July 1974.

(SEAL)
Attest:

McCOY M. GIBSON, JR.
Attesting Officer

C. MARSHALL DANN
Commissioner of Patents